United States Patent [19]
Brandon et al.

[11] Patent Number: 5,810,365
[45] Date of Patent: Sep. 22, 1998

[54] RETRACTABLE SEGMENTED PACKING RINGS FOR FLUID TURBINES

[76] Inventors: Ronald Earl Brandon, 627 Jubilee St., Melbourne, Fla. 32940; David Earl Brandon, 2166 E. Hampton Rd., Binghamton, N.Y. 13903

[21] Appl. No.: 807,584

[22] Filed: Feb. 27, 1997

[30] Foreign Application Priority Data

Aug. 5, 1996 [CN] China ................................. 96 1 09237.8

[51] Int. Cl.⁶ ................................................. F16J 15/447
[52] U.S. Cl. ........................... 277/416; 277/419; 277/421
[58] Field of Search .............................. 277/53, 416, 419, 277/421; 415/174.5

[56] References Cited

U.S. PATENT DOCUMENTS

| | | | |
|---|---|---|---|
| 967,247 | 8/1910 | Samuelson | 277/53 X |
| 2,239,637 | 4/1941 | Zesewitz | 277/56 |
| 2,600,991 | 6/1952 | Hargrove | 277/56 X |
| 3,155,395 | 11/1964 | Hoffman | 277/53 |
| 3,594,010 | 7/1971 | Warth | 277/53 |
| 4,017,088 | 4/1977 | Lerjen | 277/53 |
| 4,436,311 | 3/1984 | Brandon | 277/27 |
| 5,395,124 | 3/1995 | Brandon | 277/53 |
| 5,464,226 | 11/1995 | Dalton | 277/53 |
| 5,503,405 | 4/1996 | Jewett et al. | 277/53 |
| 5,603,510 | 2/1997 | Sanders | 277/53 |

FOREIGN PATENT DOCUMENTS

| | | | |
|---|---|---|---|
| 28259 | 10/1924 | France | 277/53 |
| 763708 | 2/1934 | France | 277/56 |
| 4101004 | 4/1992 | Japan | 415/174.5 |
| 128449 | 6/1950 | Sweden | 277/56 |
| 387069 | 4/1965 | Switzerland | 277/27 |
| 1224234 | 3/1971 | United Kingdom | 277/55 |

*Primary Examiner*—Randolph A. Reese
*Assistant Examiner*—John L. Beres
*Attorney, Agent, or Firm*—Ross, Ross & Flavin

[57] ABSTRACT

Springs are arranged in elastic fluid turbine seal ring systems to accomplish a condition of relatively large clearance while starting and during low load conditions but in cooperation with pressure forces occurring at higher loads permitting said seal ring to relocate to a position of relatively small clearance to improve sustained efficiency. Geometry of existing packing rings is improved to enhance proper motion and improve efficiency benefits by either machining the outer arcuate surface of the seal ring segment, or including raised local surfaces on both ends of the seal segments, or, in the case of multiple seal ring segments, removing a seal tooth from the discharge side of each segment and adding the removed tooth to the upstream side of the following segment, or widening the neck of a seal ring by moving its discharge side in the downstream direction.

3 Claims, 7 Drawing Sheets

PRIOR ART

RETRACTABLE SEGMENTED PACKING RINGS FOR FLUID TURBINES

BACKGROUND OF THE INVENTION

1. Field of the Invention

The present invention relates to seals employed in elastic fluid axial flow turbines and, more particularly, to segmented packing ring seals arranged both where rotatable shafts penetrate stationary turbine casings and, in addition, internal to the casings between stages and turbine sections.

2. Description of the Prior Art

Generally, such known seals prevent or reduce leakage of the fluid by creating small clearance areas with low flow coefficients between the rotating and stationary parts. Improved efficiency, minimized loss of fluid and prevention of undesirable side effects caused by leakage of fluid are objectives of such seals.

Also, these segmented, labyrinth type seals are vulnerable to rubbing damage caused by turbine misalignment, vibration and thermal distortion. Most of these damage causing factors are more likely to occur during starting, at light loads or following sudden loss of load. As a result, it would be desirable to create a condition of relatively large clearance during these conditions, to minimize possible damage to the seals, and yet still accomplish a small clearance condition at higher loads. The higher load condition corresponds to operation when efficiency is of greatest value and where turbine operation is stable relative to most of the factors which can cause damage to the seals.

It should be recognized that turbine designers already take significant steps to minimize fluid leakage. The seals are made of materials specially selected to minimize damage caused by rubbing. The seal geometry is designed with thin teeth to require the least amount of heat and force during rubbing situations.

Retractable packing rings which, during start-up conditions, have large radial clearance that automatically decreases to a small clearance condition when a predetermined flow condition has been reached, have also been successfully applied in turbine applications where the pressure forces are significantly greater than the weight forces of the packing segments.

In the U.S. Pat. No. 4,436,311 issued on Mar. 13, 1984 to Ronald E. Brandon, there is disclosed a segmented labyrinth-type shaft sealing system for fluid turbines wherein radial positioning springs are designed to bias the seal segments outward towards a large clearance position, so that the seals of a segmented seal ring are caused to be positioned at the large or retracted clearance position during starting or at low load conditions when there are low speeds and small turbine loads, and to be positioned at a small clearance position during medium to high load conditions when there are high flows and high working fluid pressure.

When designing the individual springs acting upon the seal ring segments, fluid pressure forces, and the weight and friction forces of the seal ring segments are among the factors to be considered for the seal ring segments such that the segments are in the large and small clearance positions during the respective low load and high load conditions. However, in low pressure turbine retractable seal ring applications, it may be possible that the seal ring segments situated at the bottom and lower side portions around the turbine circumference become stuck in position due primarily to weight forces from the upper ring segments bearing thereon and, therefore, such seal ring segments may not readily close into the small clearance position in the desired manner.

In U.S. Pat. No. 5,395,124 issued on Mar. 7, 1995 to Ronald E. Brandon, there is disclosed a segmented labyrinth-type shaft sealing system for fluid turbines wherein vertical gravity springs are employed in lower half segments to provide a lifting force equal to the weight of the segment to essentially counter the weight force of said lower half segments. This invention allows application of retractable seals to low pressure turbines.

The retractable seals described in the above two references are in use in steam turbines and have successfully provided improved efficiency and extended useful life to such seals. As discussed below, further practical improvements are available.

When the packing rings or seal rings are in the retracted or large clearance position, it is desirable to have the contact surfaces that limit the outward motion of the segment be of the same diameter. In this way, the full motion can occur and in addition, there can be no rocking of the curved segment when only one point of contact exists.

In addition, many existing packing rings, because of the original designed geometry, cannot be made properly retractable. This must be corrected to achieve retractability by removing one or more teeth or restrictions from the discharge side of the ring.

In the case of turbine seals where multiple packing rings are employed for a single, continuous leakage path, the removal of teeth discussed above can be avoided by removing a tooth from the discharge side of a packing segment and then transferring it to the inlet side of the following packing segment.

SUMMARY OF THE INVENTION

Accordingly, it is an object of the present invention to provide further improvements in the application of retractable segmented packing rings for fluid turbines.

It is a further object to provide improved motion in the opening, large clearance, direction of the packing with a more stable position of the packing segment when in its large clearance position.

It is another object of the invention to enable use of retractable packing even where the existing packing geometry is less than desirable.

And still further, it is an object of this invention to minimize the removal of seal teeth where multiple packing rings are employed in a continuous leakage path.

Briefly stated, the invention is practiced by providing springs that cause seals to be positioned at a large clearance position during starting or low load conditions. The spring forces are overcome, however, by pressure forces which develop with low to medium load conditions such that the seals are repositioned to a small clearance as load is increased.

BRIEF DESCRIPTION OF THE DRAWINGS

For a better understanding of this invention, reference is made to the accompanying drawings in which.

DESCRIPTION OF THE PREFERRED EMBODIMENT

Figure 1:
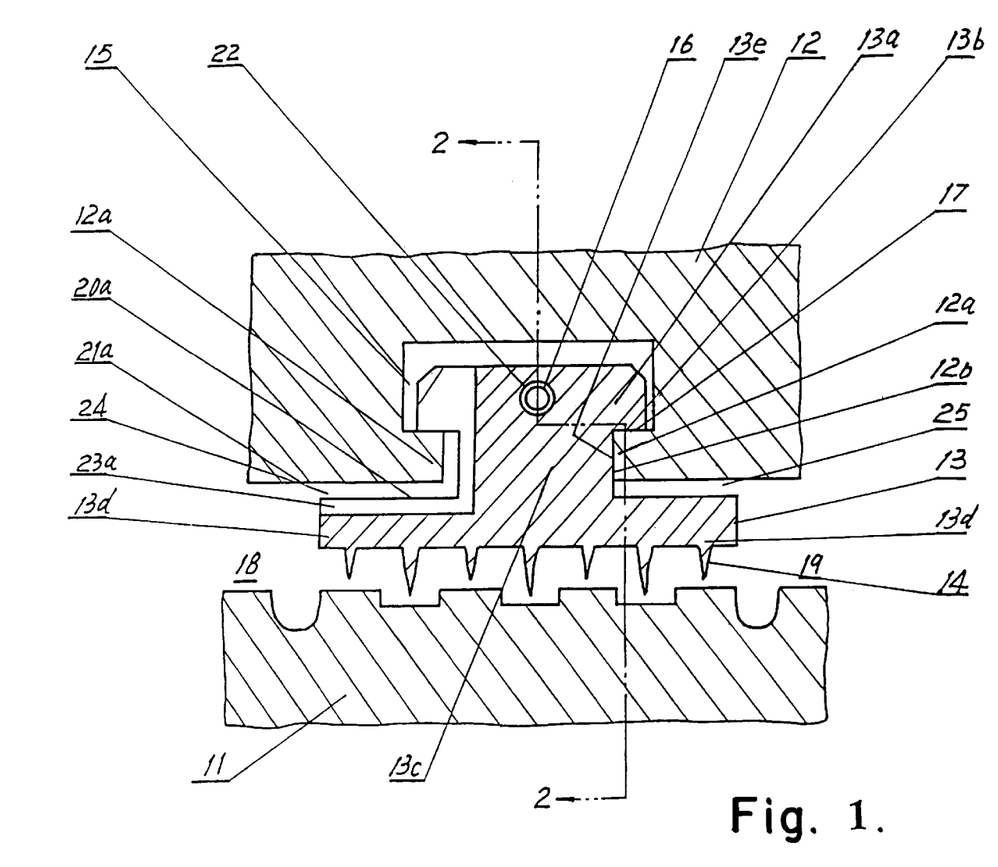
FIG. 1 is a horizontal elevation drawing, partly in section, of a multistage axial flow elastic turbine showing a portion of one stage with a shaft seal ring.

Referring to FIG. 1, the turbine includes a rotor, a portion of which is shown at 11, and a casing, a portion of which is shown at 12. With regard to interstage seals, it should be noted that part 12, the casing, could instead be called a diaphragm. Only one seal ring 13 is illustrated, although several such rings could be arranged in series. It will be understood by those skilled in the art that the remainder of the turbine necessarily includes means for introducing steam at high pressure and exhausting it at lower pressure, with nozzles, buckets, wheels and other components which do not need inclusion here to explain the seal function which is affected by the invention. The seal ring shown is typical of many found throughout the turbine.

The seal ring 13 includes a plurality of teeth 14 that are disposed in opposition to circumferential portions of the shaft which are alternately stepped up and down in radius. With high pressure fluid at 18 and low pressure at 19 there will be a positive force to cause fluid leakable between the multiple restrictions formed by the small openings between the teeth 14 and the shaft 11. The combination of the clearance area, the relative sharpness of the teeth, the number of the restrictions, the fluid conditions including pressure and density, and the geometry of the leakage path determine the amount of leakage flow according to formulae and empirical constants which are well known. Many other geometrical arrangements are also used to provide multiple or single leakage restrictions than the style illustrated.

Figure 2:
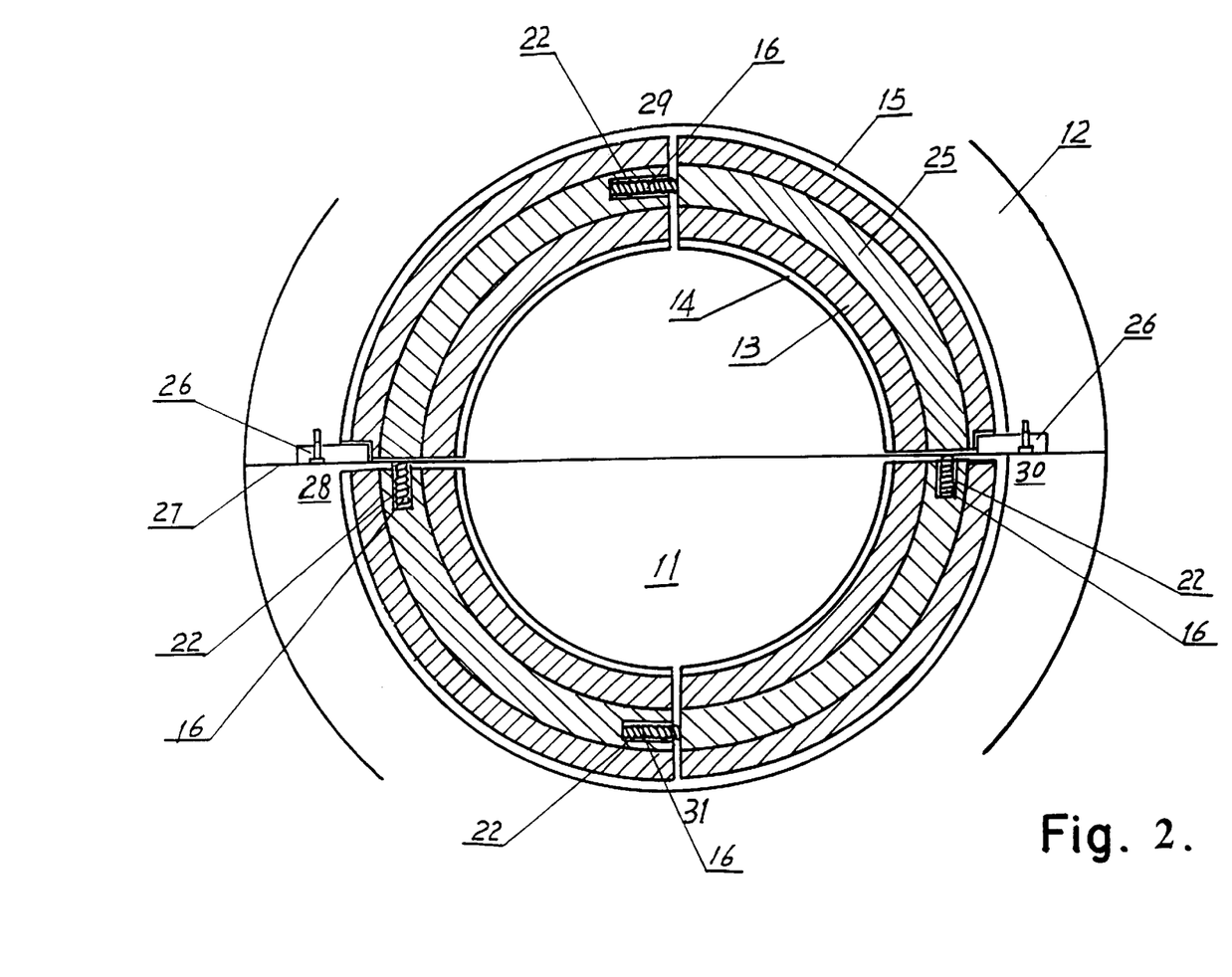
FIG. 2 is a cross-section view taken along lines 2—2 of FIG. 1.

The seal ring is retained in annular groove 15 of the casing 12. As shown in FIG. 2, the seal ring is comprised of four or more segments each disposed within the groove 15 to accommodate assembly or disassembly of the casing by locating the seal ring segments to separate at the joint 27 of the casing. Springs 16, are located in hole 22 at one end of each seal ring segment to hold the segments in a compressed condition. Positive circumferential location and retainment of the seal ring segments and springs 16 are assured by locking pieces 26 which are provided above casing joints 27. It is to be understood that while the words "seal ring 13" are used herein, they may apply to an individual seal ring segment and, therefore, should be read in the context of the sentence.

Each segment of the seal ring 13 is shown including the inner ring portion, indicated in FIG. 1 by numeral 13d, having the seal teeth 14 extending from its radially inward surface while its radially outward surface 20a limits the large clearance position by means of its contact with the radial surface 21a of the casing 12. The seal ring 13 also includes an outer ring portion 13a disposed within the casing groove 15 with an inner circumferential surface 13b which, as described below, limits the small clearance position of the seal ring segments by restraining their radial inward movement by contact of surface 13b with surface 17 on the shoulder 12a of casing 12. The seal ring 13 shown in FIG. 1 also includes a neck portion 13c between said inner ring section and said outer ring section into which the shoulder 12a of the casing interlocks to axially locate the ring segment. As described below seal ring neck portion 13c provides a contact pressure surface which, as shown at 12b, is in direct contact with the casing shoulder 12a.

Figure 3:
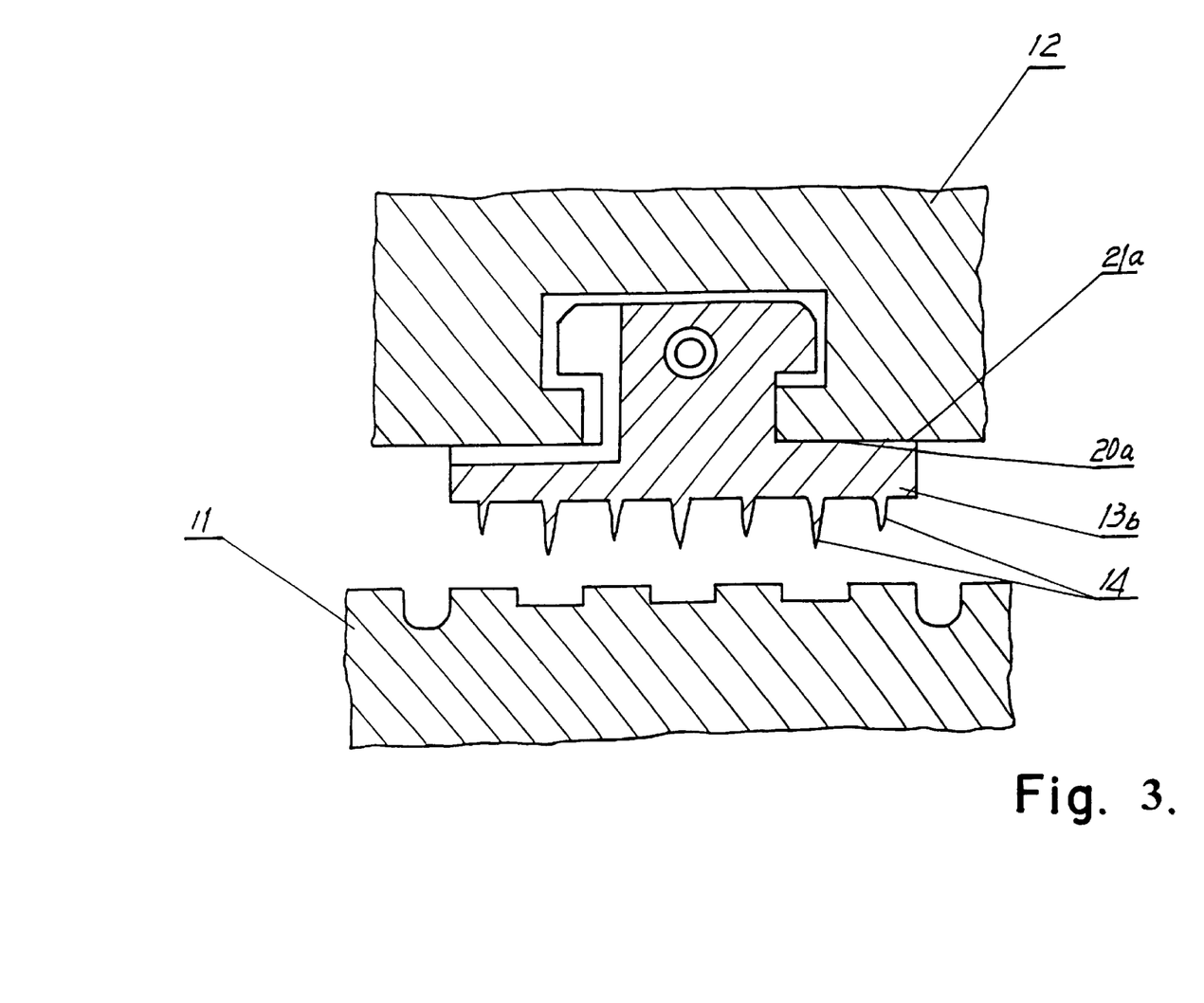
FIG. 3 is a horizontal elevation drawing partly in section showing a portion of one stage with a shaft seal ring in its retracted position.

At low or no load conditions, only the weight of the seal ring segments, the confining limits of the casing, and the force of the springs 16 act on the seal rings. The springs are selected with sufficient strength and dimension under these conditions to cause the seal ring segments to separate at each segment joint as shown in FIGS. 2 and 3. This causes the seal rings to seek larger diameters but limited to that available within the annular space 24 and 25. When this space is decreased to permit contact between surfaces 20a and 21a, no further enlargement can occur. The annular space is sized to allow, by the radially outward movement of the ring segments, sufficient space to accommodate the worst expected transient misalignment of rotor and casing without damage to the seal ring teeth 14, such as 3 millimeters.

After the turbine has been accelerated to operating speed and partially loaded, the worst of thermal gradients, vibration and misalignment problems are normally ended. As load is increased, the fluid pressure increases proportionately around the rings in such fashion, as discussed later, to cause the springs to be compressed and the seal ring segments to move radially inward until restrained by contact at surface 17. The dimensions of the seal ring and surface 17 on the casing are selected to create the smallest clearance between the teeth 14 and the rotor surface determined to be practical for loaded, relatively steady state operation, such as 0.5 millimeters.

In FIG. 1, the seal ring 13 is shown in its high load, small clearance condition. The higher pressure side of the seal is identified at 18. This pressure persists in the annular spaces 24 and 15 as a result of an open communication created by one or more local openings 23a. The low pressure condition 19 persists also in the annular space 25.

It can easily be recognized that the resultant axial force of these pressures will cause the seal ring to be pushed toward the low pressure area 19 so as to create a leak resistant seal at location 12b between the seal ring 13 and the casing 12. For a geometry of known dimensions and pressures, the magnitude of this axial force can easily be calculated; also the radial force that would be required to overcome metal-to-metal friction in order to move the seal ring in a radial direction.

In a similar fashion, but somewhat more complicated, the other radial forces can also be determined. With the exception of the pressure distribution along the seal ring inner surface (that facing the rotor), all other pressures were identified in the two paragraphs above. There will be a pressure drop across each tooth of the seal. Using the known condition of flow continuity through each tooth, with constant enthalpy expansions, a relatively accurate distribution of pressure can be calculated using a trial and error process for the series of constant area throttlings. On some packing rings a high mach number will exist to complicate the calculation, but this will be known and accounted for by those skilled in the art.

The radial pressure distribution is used to select the dimensions of the seal ring to achieve an appropriate resultant inward force on the seal ring. The design goal is to establish for the seal ring a force condition that will cause the ring to overcome its weight, spring and friction forces so as to shift it to its inward or small clearance position for the pressure conditions which can be predicted to exist when the turbine is operating at a small but significant load such as 5 to 25%.

For turbine locations with relatively small pressure conditions it will be recognized quickly by those familiar with the art that the seal rings should be made lighter in weight and employ springs with weaker spring constants. It should be especially noted that the geometry of the seal rings can be altered to adjust the magnitude of the resultant inward force caused by pressure.

Figure 4:
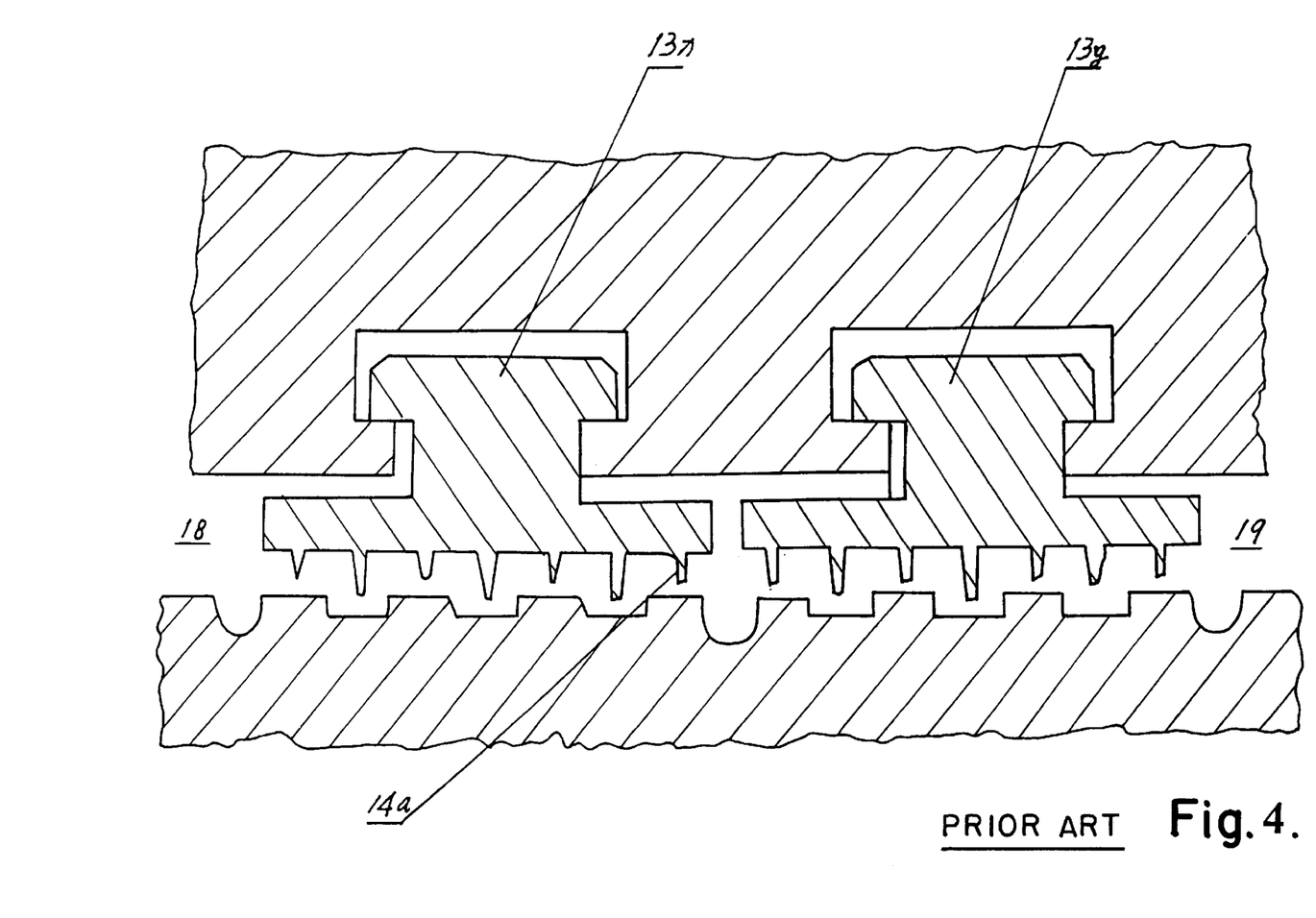
FIG. 4 is a horizontal elevation drawing, partly in section showing a prior art multiple ring shaft seal.

FIG. 4 shows a typical prior art situation that can be encountered with multiple seal rings on an existing turbine. Force calculations would show that one tooth must be removed from the downstream side of each seal ring. While this causes only a minor harmful effect on leakage rates, it would be preferred to avoid such a loss.

Figure 5:
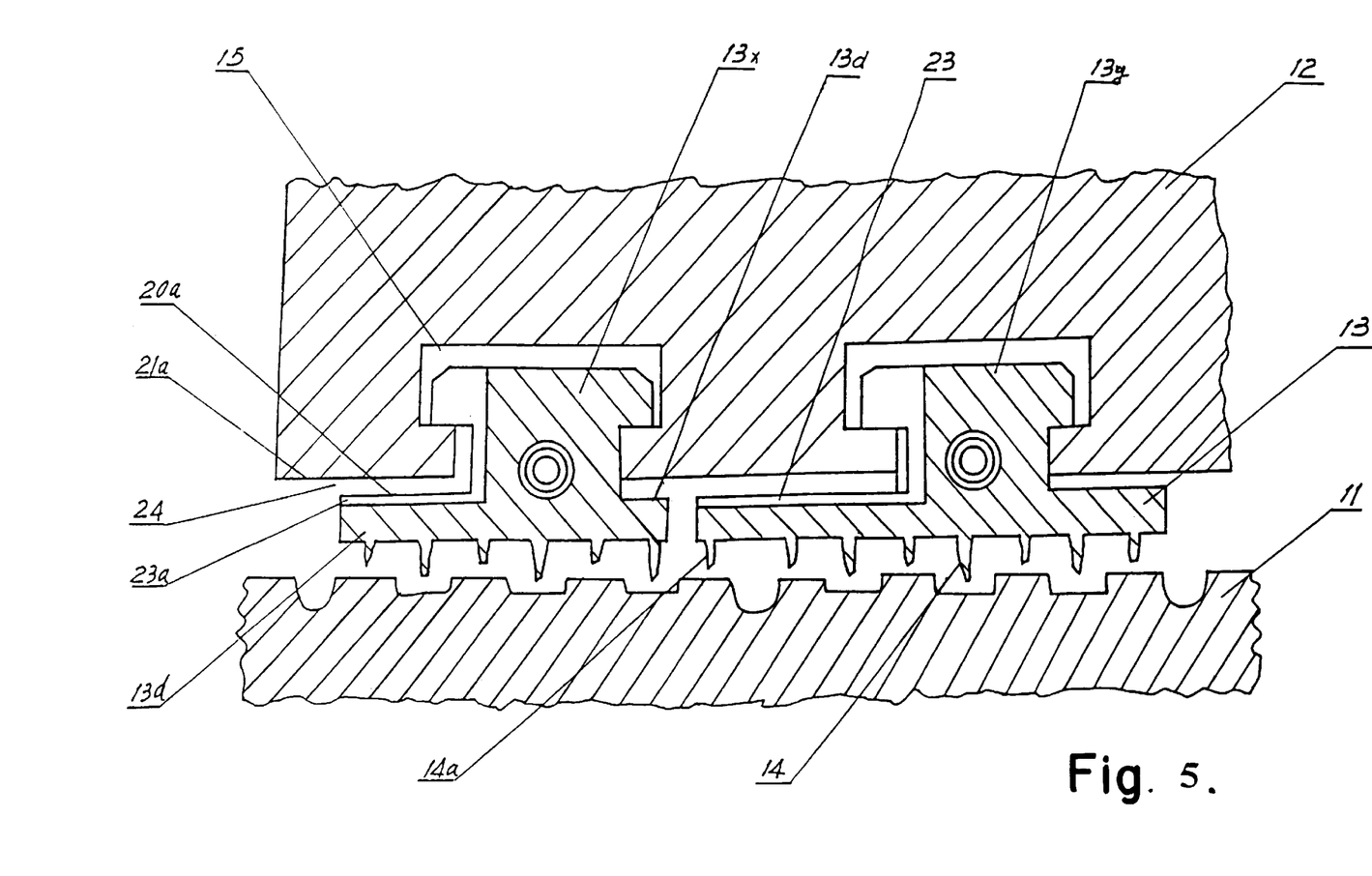
FIG. 5 is a horizontal elevation drawing, partly in section of the multiple ring shaft seal shown in FIG. 4 modified in accordance with the invention.

FIG. 5 shows one way of decreasing this loss according to the invention. Tooth 14a has been removed from ring 13x and added to ring 13y. This will cause both rings to retract and close properly without the loss of any packing teeth.

It is noted that where multiple rings are employed for a single, continuous leakage path, it is necessary to design the springs to allow closure of one seal ring first, then-when steam flow has increased, allow the next ring to close and so forth, until the last ring is closed.

Figure 6:
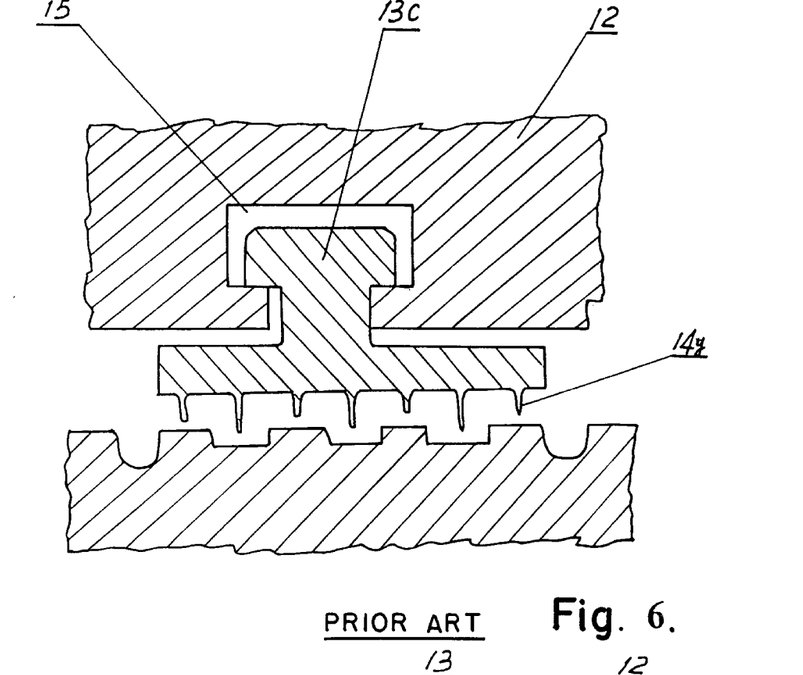
FIG. 6 is a horizontal elevation drawing, partly in section, showing a prior art shaft seal ring with undesirable geometry.
Figure 7:
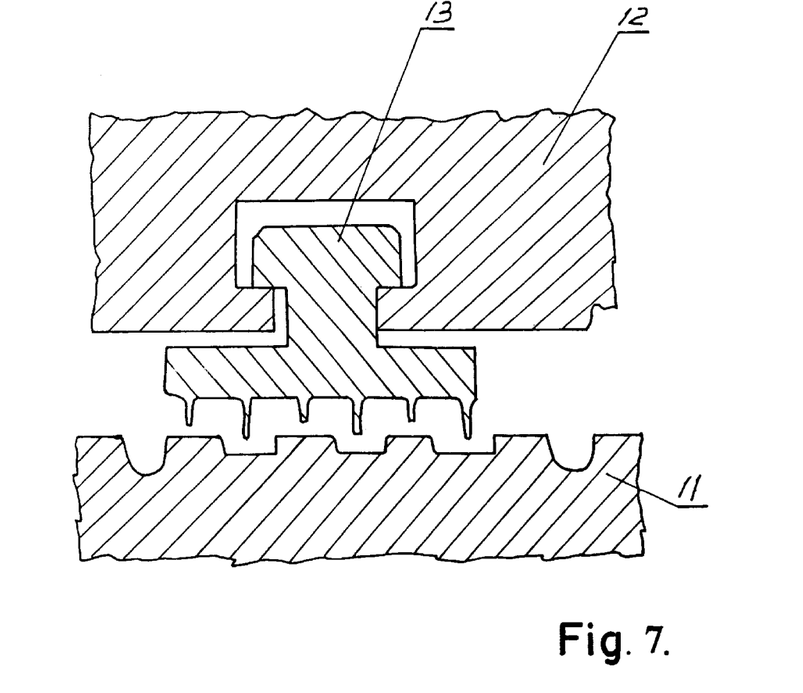
FIG. 7 is a horizontal elevation drawing, partly in section, showing the seal ring of FIG. 6 modified in accordance with the invention to accomplish proper retractable motion.

FIG. 6 shows an existing or prior art seal ring application whose geometry would be unsatisfactory for retractable operation. FIG. 7 shows that the retractability would be improved according to the invention by the removal of tooth 14y as originally existed on FIG. 6.

Figure 8:
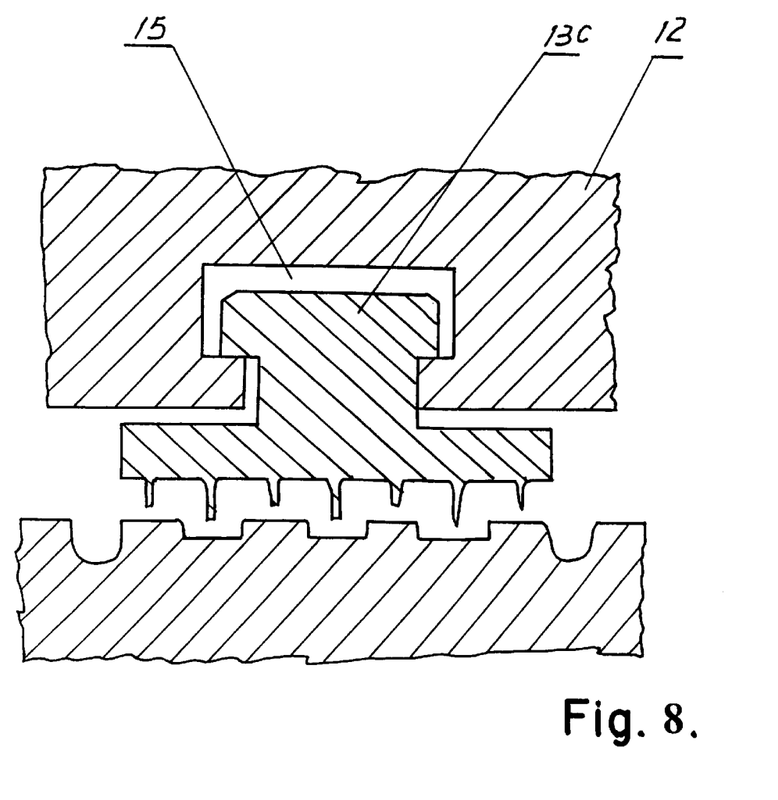
FIG. 8 is a horizontal elevation drawing, partly in section, showing another modification of the seal ring of FIG. 6 to accomplish proper retractable motion.

FIG. 8 shows a preferred solution according to the invention. Neck 13c has been widened, by adding material to the downstream side. This increases the pressure force tending to close the packing ring without removing a seal tooth. This method requires machining of the annular groove 15.

As will be recognized by those familiar with elastic fluid turbines, the internal pressure at most locations throughout the turbine is approximately proportional to load. As load and mass flow is increased, local pressures increase in approximately linear fashion. Under these circumstances, the pressure drop across turbine stages and most turbine seal rings also increase in a predictable and linear fashion with increasing load and fluid flow. It is this relationship that can allow a designer to select a condition of load and pressure for each seal ring where the pressure forces can be expected to overcome the combination of spring force, weight, and friction so as to move the seal ring to its small clearance condition.

As discussed above, the designer can partially control this circumstance by varying the dimensions, weight and spring constants employed within the seal ring.

A considerable variety of springs 16 can be employed. They must be selected to have long life and stable characteristics while exposed to high temperature, vibration and possible corrosive conditions. Coil shaped springs are illustrated, but flat springs and others can be employed.

It will be noted that the springs see different requirements depending on circumferential position. In FIG. 2, it can be noted that for the four segment seal rings illustrated, there are four springs required, one each at locations 28, 29, 30 and 31.

Locations 28 and 30 require a spring that must be capable of pushing the upper segments to their maximum radial position while supporting the weight of the seal ring segment and resisting a selected magnitude of pressure forces.

Location 29 must have a spring designed to resist the selected pressure distribution force from the two opposed ring segments in addition to the small weight-caused component of force which tends to decrease radial clearance at that location.

Location 31 must be designed to resist the selected level of pressure distribution forces on the two opposing segments less the component of force caused by the weight of the segments which tend to compress the spring.

For six segment seal or packing rings, four springs are adequate, with one spring at each end of both the top and bottom segments.

The springs should be physically sized and contained by surrounding parts to make escape difficult, even if broken.

The butt gap between seal ring segments must be carefully selected. This choice is made to properly reflect thermal expansion of the seal ring relative to that of the casing or diaphragm in which it is held. Both temperature and thermal coefficient of expansion must be considered for each component.

It is desirable that the seal ring, when in its open or retracted position, be in a stable, non-rocking position with the same tooth-to-shaft clearance at both ends of the seal segment. This cannot happen if the machined radius of surface 20a and surface 21a are not the same. Surface 21a, the inner surface of the shell 12, would normally be an accurately machined circle. Surface 20a, would conventionally be cut to provide a diameter of about 5 millimeters smaller than the circle of surface 21a. As suggested above, this is undesirable. The packing segments should be cut to provide surface 20a with the same diameter as surface 21a, yet still permit the desired motion.

Figure 9:
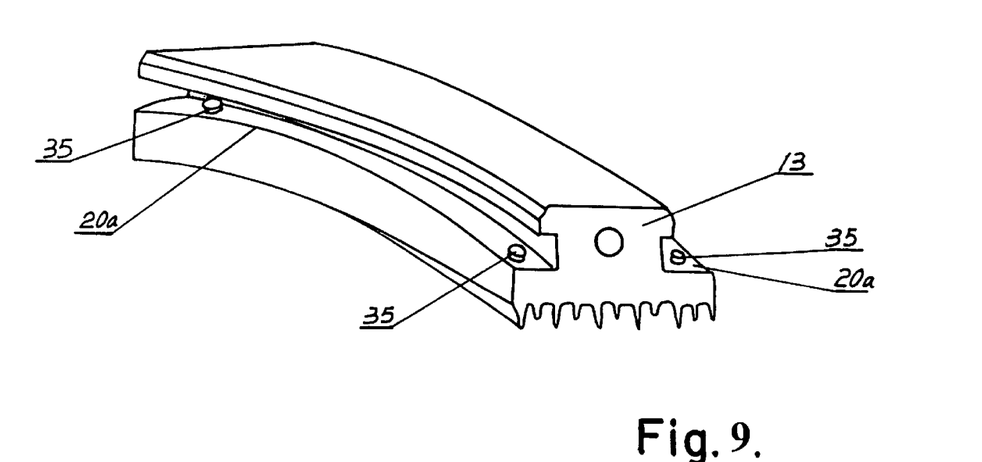
FIG. 9 is a perspective view of one seal ring segment.

If this is not practical, a second satisfactory method is to add a raised surface at each end of each segment that creates a proper ability for motion of the segment toward the shell surface 21a from the closed, small clearance position. Such raised surface is illustrated in FIG. 9. Three of four raised areas 35 are shown on the appropriate corners of surface 20a. These will make the opening contact with shell 12 on surface 21a, permitting proper opening motion even though the diameter of surface 20a is not the same as surface 21a.

Various other modifications of the invention may occur to those skilled and it is desired to secure, by the appended claims, all such modifications as fall within the true spirit and scope of the invention.

What we claim as new and desire to secure by letters patent is:

1. In an elastic fluid turbine employing seals to minimize leakage between rotating and stationary components, an improvement in the seal arrangement utilizing the combination of:

a seal ring comprised of spaced segments disposed in an end-to-end relationship and supported by and at least partially contained in an annular groove formed in a stationary casing to permit motion of said seal ring into a clearance area between said casing and a rotating shaft between a large diameter position and a small diameter position corresponding respectively to a large clearance position and a small clearance position of said seal ring with regard to said rotating shaft, said annular groove being partially defined by a pair of opposing, spaced apart shoulders on said casing which form an opening of said annular groove extending radially into said clearance area between said casing and said rotating shaft, each segment of said seal ring including an inner arcuate portion having seal teeth extending therefrom in the direction of and adjacent to said rotating shaft, a radially outwardly facing arcuate surface on each segment of said seal ring which is located opposite to a radially inwardly facing arcuate surface of said casing for limiting said large clearance position by contact between said opposing surfaces, each seal ring segment having an outer ring portion disposed within said annular groove for both axial and radial movement therein and having a pair of shoulders extending axially in opposite directions for making radial contact respectively with said pair of spaced apart shoulders on said casing and thereby limiting said small clearance position, and a neck portion connected between said inner arcuate portion and said outer ring portion and extending between said casing shoulders, said neck portion having an axial thickness which is less than the distance between said opposing casing shoulders to define a high pressure area at one side of the neck portion and a low pressure area at an opposite discharge side of the neck portion to thereby axially locate said seal ring against one of said casing shoulders and provide a contact pressure seal at the low pressure area of said neck portion which is subject to lower turbine fluid pressure; radial positioning means comprising compressed spring means biased against the ends of said segments of said seal ring to forcibly cause said segments to move to said large clearance position, and raised local surfaces on the radially outwardly facing arcuate surface of each segment located only adjacent each end of each segment, said raised local surfaces being sized radially to permit the desired motion from small to large clearance positions and to provide a contact between said radially outwardly facing arcuate surface of each segment and the inner surface of the casing in the large clearance position to insure a stable, non-rocking position of each segment with equal tooth-to-shaft clearance at both ends of the segment, while working fluid which is freely admitted to the annular space between said casing and said seal ring will urge each said segment toward said small clearance position, whereby at low speed and small turbine loads the spring forces will predominate, while at high flows and high working fluid pressure the pressure forces will predominate.

2. An elastic fluid turbine as recited in claim 1, wherein there are multiple segmented seal rings disposed in side-by-side adjacency and wherein there are inadequate inward pressure forces to cause closure at moderate turbine flow conditions, the improvement which comprises removing a seal tooth from the low pressure discharge side of each seal segment, said removed tooth then being added to the high pressure side of the adjacent seal segment.

3. An elastic fluid turbine as recited in claim 1, wherein there are inadequate inward pressure forces to cause closure at moderate turbine flow conditions, the improvement which comprises widening the neck of each seal ring segment thereby moving the discharge side in the downstream direction.

* * * * *